United States Patent
Wenn

(10) Patent No.: US 10,331,513 B2
(45) Date of Patent: Jun. 25, 2019

(54) ZERO OVERHEAD CODE COVERAGE ANALYSIS

(71) Applicant: Microchip Technology Incorporated, Chandler, AZ (US)

(72) Inventor: Darren Wenn, Buckinghamshire (GB)

(73) Assignee: MICROCHIP TECHNOLOGY INCORPORATED, Chandler, AZ (US)

( * ) Notice: Subject to any disclaimer, the term of this patent is extended or adjusted under 35 U.S.C. 154(b) by 148 days.

(21) Appl. No.: 15/221,409

(22) Filed: Jul. 27, 2016

(65) Prior Publication Data

US 2017/0031750 A1    Feb. 2, 2017

Related U.S. Application Data

(60) Provisional application No. 62/198,025, filed on Jul. 28, 2015.

(51) Int. Cl.
| | | |
|---|---|---|
| *G06F 11/10* | (2006.01) | |
| *G06F 11/14* | (2006.01) | |
| *G06F 9/48* | (2006.01) | |
| *G06F 11/08* | (2006.01) | |
| *G06F 11/28* | (2006.01) | |

(52) U.S. Cl.
CPC ........ *G06F 11/1004* (2013.01); *G06F 9/4843* (2013.01); *G06F 11/08* (2013.01); *G06F 11/1012* (2013.01); *G06F 11/1435* (2013.01); *G06F 11/28* (2013.01)

(58) Field of Classification Search
CPC .... G06F 11/1004; G06F 9/4843; G06F 11/08; G06F 11/28; G06F 11/1012; G06F 11/1435

USPC ... 714/758, 724, 759, 746, 800, 801, 48, 49, 714/52; 710/55; 711/206-208
See application file for complete search history.

(56) References Cited

U.S. PATENT DOCUMENTS

| | | | | |
|---|---|---|---|---|
| 7,136,982 | B2* | 11/2006 | Britt, Jr. | G06F 8/658 |
| | | | | 711/170 |
| 7,171,606 | B2* | 1/2007 | Blackburn | G06Q 20/3552 |
| | | | | 714/763 |
| 7,992,009 | B2* | 8/2011 | Seo | G06F 11/1004 |
| | | | | 710/52 |
| 2003/0093643 | A1* | 5/2003 | Britt, Jr. | G06F 8/658 |
| | | | | 711/170 |
| 2007/0168793 | A1* | 7/2007 | Seo | G06F 11/1004 |
| | | | | 714/724 |
| 2007/0260623 | A1* | 11/2007 | Jaquette | G06F 11/1004 |
| 2009/0252323 | A1* | 10/2009 | Cooper | G06F 21/6218 |
| | | | | 380/54 |

(Continued)

FOREIGN PATENT DOCUMENTS

EP    1737132 A1    12/2006    ............ H03M 13/09

OTHER PUBLICATIONS

International Search Report and Written Opinion, Application No. PCT/US2016/044372, 11 pages, dated Oct. 19, 2016.

*Primary Examiner* — John J Tabone, Jr.
(74) *Attorney, Agent, or Firm* — Slayden Grubert Beard PLLC

(57) ABSTRACT

An integrated circuit includes comprising a cyclic redundancy check (CRC) circuit configured to read data identifying an execution path from code executed by a processor, determine a CRC check value for the data, and, based upon the CRC check value, determine whether the execution is valid.

18 Claims, 4 Drawing Sheets

(56) References Cited

U.S. PATENT DOCUMENTS

2012/0066551 A1* 3/2012 Palus .................. G06F 11/28
714/39

* cited by examiner

```
12:         uint8_t AsciiToHex (unsigned char a)
0681  00F1  MOVWF c13:
14:             // convert one ascii hex character
                // to a 4-bit result
15:             uint8_t result;
16:
17:             if ((a >= 'a') && (a <= 'f'))
0682  3061  MOVLW 0x61
0683  0271  SUBWF c, W
0684  1C03  BTFSS STATUS, 0x0
0685  2E8D  GOTO 0x68D
0686  3067  MOVLW 0x67
0687  0271  SUBWF c, W
0688  1803  BTFSC STATUS, 0x0
0689  2E8D  GOTO 0x68D
18:                 result = (a - 'a' + 0xA);
068A  0871  MOVF c, W
068B  3EA9  ADDLW 0xA9
068C  2EA4  GOTO 0x6A4
19:             else if ((a >= '0') && (a <= '9'))
068D  3030  MOVLW 0x30
068E  0271  SUBWF c, W
068F  1C03  BTFSS STATUS, 0x0
0690  2E98  GOTO 0x698
0691  303A  MOVLW 0x3A
0692  0271  SUBWF c, W
0693  1803  BTFSC STATUS, 0x0
0694  2E98  GOTO 0x698
20:                 result = (a - '0');
0695  0871  MOVF c, W
0696  3ED0  ADDLW 0xD0
0697  2EA4  GOTO 0x6A4
21:             else if ((a >= 'A') && (a <= 'F'))
0698  3041  MOVLW 0x41
0699  0271  SUBWF c, W
069A  1C03  BTFSS STATUS, 0x0
069B  2EA3  GOTO 0x6A3
069C  3047  MOVLW 0x47
069D  0271  SUBWF c, W
069E  1803  BTFSC STATUS, 0x0
069F  2EA3  GOTO 0x6A3
22:                 result = (a - 'A' + 0xA);
06A0  0871  MOVF c, W
06A1  3EC9  ADDLW 0xC9
06A2  2EA4  GOTO 0x6A4
23:             else
24:                 result = 16;
06A3  3010  MOVLW 0x10
06A4  00F0  MOVWF __pcstackCOMMON
25:
26:             return result;
27:         }
06A5  0008  RETURN
```

FIG. 2

| FUNCTION INPUT | CYCLE COUNT | BIT LENGTH | CRC |
|---|---|---|---|
| a | 15 | 120 | 6045 |
| d | 15 | 120 | 6045 |
| f | 15 | 120 | 6045 |
| 0 | 20 | 160 | 137 |
| 5 | 20 | 160 | 137 |
| 9 | 20 | 160 | 137 |
| A | 29 | 232 | 5408 |
| D | 29 | 232 | 5408 |
| F | 29 | 232 | 5408 |
| M | 27 | 216 | 3092 |

ZERO OVERHEAD CODE COVERAGE ANALYSIS

RELATED PATENT APPLICATION

This application claims priority to commonly owned U.S. Provisional Patent Application No. 62/198,025, filed Jul. 28, 2015, the entire contents of which are hereby incorporated by reference herein for all purposes.

TECHNICAL FIELD

The present disclosure relates to a method for zero overhead code coverage analysis, in particular within microcontrollers.

BACKGROUND

Microcontrollers are single chip integrated circuits comprising a central processing unit (microcontroller core), a plurality of peripheral devices, I/O ports, and memory, etc. In other words, a microcontroller is a system on a chip that requires little or no external components. Many microcontrollers are designed according to the Harvard model which provides for separate program and data memory. However, von Neumann type microcontrollers with a combined program and data memory space also exist.

Performing code coverage analysis allows for the formal verification of running code. Code coverage may be used to determine whether segments of code should have been executed. Formal verification of code may be performed according to standards such as WC 61508, WC 26262, D0-178B/C, or DO-178B.

SUMMARY

Embodiments of the present disclosure include an integrated circuit. The circuit may include a cyclic redundancy check (CRC) circuit. The CRC circuit may be configured to read data identifying an execution path from code executed by a processor, determine a CRC check value for the data, and based upon the CRC check value, determine whether the execution is valid.

Embodiments of the present disclosure include a processor. The processor may include a central processing unit and a CRC circuit. The CRC circuit may be configured to read data identifying an execution path from code executed by a processor, determine a CRC check value for the data, and based upon the CRC check value, determine whether the execution is valid.

Embodiments of the present disclosure include a method. The method may include reading data identifying an execution path from the code as executed by a central processing unit, determining a CRC check value for the data, and, based upon the CRC check value, determining whether the execution is valid.

BRIEF DESCRIPTION OF THE DRAWINGS

FIG. 2 illustrates example code that may be validated;

DETAILED DESCRIPTION

Figure 1:
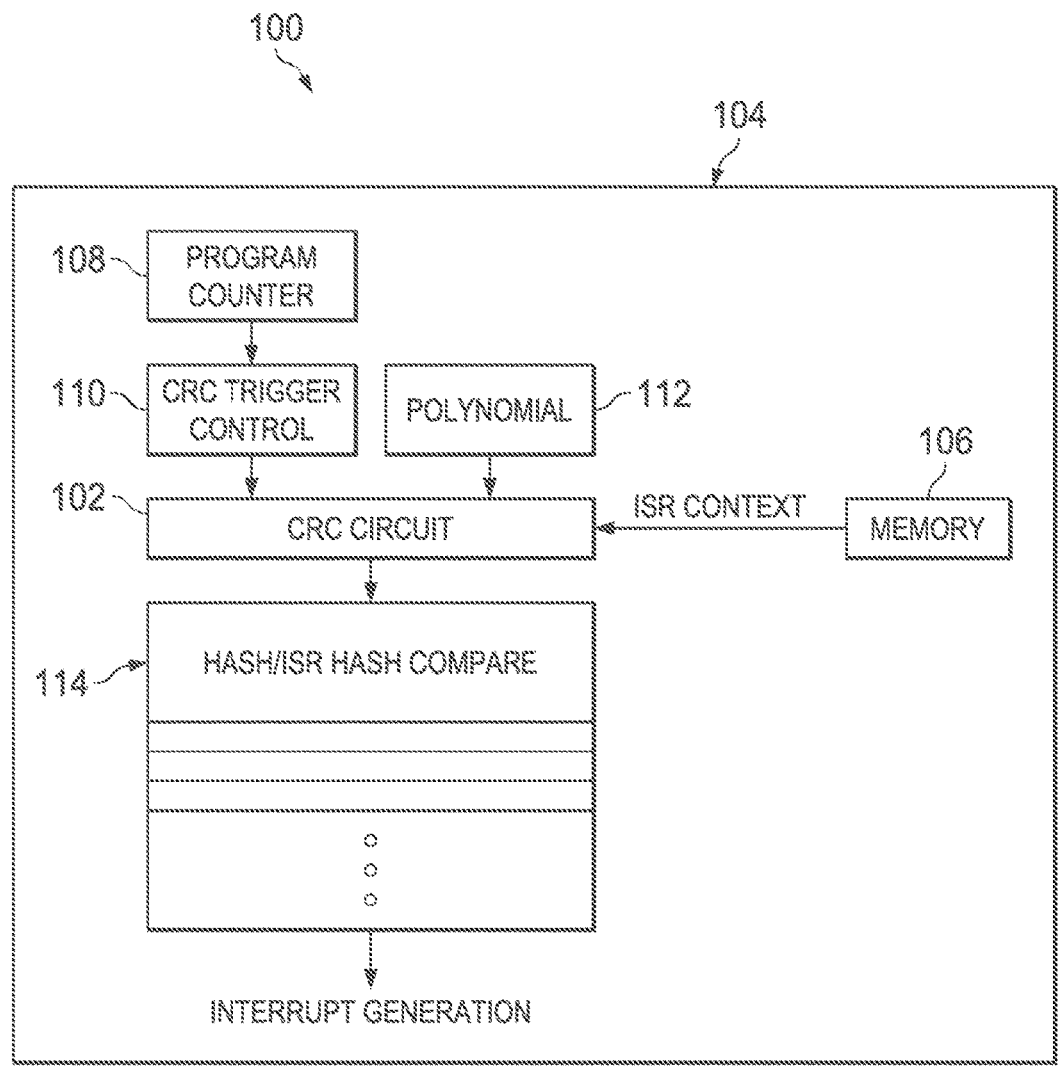
FIG. 1 illustrates an example embodiment of a system for code coverage.

FIG. 1 illustrates an example embodiment of a system 100 for verifying code for execution. Such execution may be for code on, for example, a microcontroller, embedded device, system-on-chip, or other suitable system. For example, a microcontroller 104 is illustrated in FIG. 1. In one embodiment, system 100 may formally verify code or the device without any program cycle overheads. This may provide faster and easier analysis and testing of microcontroller code or for code on other resource strained systems. Resources may be strained on such systems because of small form factors, limited processing power or memory, or similar constraints. Furthermore, code that is executing on such a system might be critical or time-sensitive, such that the code is timing constrained. The time constraints of the code and/or the limited resources of the device to execute code may prohibit code test instruments. Such code test instruments may include test code, probes, or other mechanisms inserted into code that is otherwise to be tested. Such code test instruments may typically derive from large software providers and need ample processor resources. In contrast, resource constrained 8/16/32-bit processors, such as microcontrollers, have little memory or may be executing timing critical code that cannot tolerate the disruption of test instruments (which as described above, will include additional instruction code) being added to the program. Certain applications being used in safety critical systems need testing in the final system in order to facilitate testing of the full range of inputs and conditions. The test techniques that are invasive may require static and dynamic analysis of code using white-box and black-box methodologies, using custom harnesses. This might be performed actively or passively (behind-the-scenes) by controlling the code generation process. Such test techniques may change the program flow and timing. Furthermore, such techniques may require function calls, bit toggles, and additional cycles.

According to various embodiments, a device within or communicatively coupled to microcontroller 104 (or other entity for which code is to be tested) may perform formal code coverage analysis. In one embodiment, system 100 may include a cyclic redundancy check (CRC) circuit 102 to perform code coverage analysis. In a further embodiment, CRC circuit 102 may perform code coverage analysis with no cycle overhead during code sequences. CRC circuit 102 may be implemented within the entity to be tested (such as microcontroller 104) or communicatively coupled to such an entity.

CRC circuit 102 may be implemented in any suitable manner. In one embodiment, CRC circuit 102 may be implemented solely within hardware. CRC circuit 102 may be implemented using an appropriate combination of analog and digital circuitry. CRC circuit 102 may be implemented using an application specific integrated circuit, a field programmable gate array, or other entity. In one embodiment, CRC circuit 102 may be implemented without use of execution cycles of the main code processors of microcontroller 104.

CRC circuit 102 may perform cyclical redundancy checks. CRC circuit 102 may perform such checks to detect errors including, in system 100, code that has unexpectedly executed or executed in an unexpected manner in microcontroller 104. Input data for CRC circuit 102 may be analyzed and a check value created based upon such input data. The check value may be created in any suitable manner. In one embodiment, CRC circuit 102 may perform a polynomial division of the contents of the input data. Any suitable polynomial may be used. The check value may be a remainder of the result of the division. The check value may be a redundant value, in that it may be added to or sent separately than input data, but does not change the input data. The check value may be of a fixed length. The check value may be treated and handled as a hash function. Given the input data, CRC circuit 102 may generate a fixed length binary sequence that implements the check value. The check value may be appended to the original data. The combination of the input data and the check value may be considered a codeword. When the codeword is received or read, the check value may be compared against a freshly generated check value. The freshly generated check value may be created from the codeword data that was received or against expected codeword data.

In one embodiment, CRC circuit 102 may generate check values from data representing code that is executing in microcontroller 104. CRC circuit 102 may compare a sample the check value generated from executing code against check values of code that is known to be authorized and valid. If the sample check value matches the known check values, then the code generated by the sample code may be validated. If the sample check value does not match any known check values, then the code generated by the sample code may be determined to be invalid.

CRC circuit 102 may use any suitable information as input. In one embodiment, CRC circuit 102 may detect the status of operation or execution in microcontroller 104. Such detection may be performed by, for example, analyzing input from the CPU of microcontroller 104 such as program counter 108. Program counter 108 may be implemented by registers, memory, or other suitable mechanisms to indicate the place in a given program that is to be executed. Such a place may be denoted by address. In another embodiment, CRC circuit 102 may determine values within memory. Such memory may be read from flash memory 106, although any suitable memory source may be used. The values within memory may denote the commands, opcodes, parameters, instructions, or other data used for executing code. In yet another embodiment, CRC circuit 102 may utilize a polynomial 112. Polynomial 112 may define the polynomial to be used to perform the CRC check to generate check values. Values from flash memory 106 and/or program counter 108 may be used to form the data that is to be checked by performing the CRC check. Program counter 108 may yield an instruction or execution count.

Values from program counter 108 may be further analyzed to determine whether a particular event has occurred on microcontroller such that code should be verified. Such events may be defined in system 100. For example, CRC circuit 102 may be configured to perform, start, or stop checks and analysis based upon one or more of immediate trigger/manual trigger on next instruction cycle; trigger on specific instruction match (implemented, for example, by branch or jump instructions or a match on defined instruction type); or trigger on address match (i.e. calling address or entry point address of function). The particular start or stop trigger criteria may be set according to software instructions that configure CRC circuit 102 and its associated devices. The triggering may be controlled by an appropriate circuit, gate, register, or other mechanism such as CRC trigger control 110. CRC trigger control may accept the program counter 108 as input and trigger operation of CRC circuit 102 and its associated mechanisms. Appropriate setting of trigger mechanisms may be performed in the presence of or considering the possibility of interrupts. These may be considered by, in on embodiment, by omitting interrupts from the analysis or, in another embodiment, including them in the program path analysis.

CRC circuit 102 may be configured to verify data transmissions. However, in one embodiment, CRC circuit 102 may be configured to verify executed code. The polynomial may be configured with an appropriate value known to produce statistically unique results. CRC circuit 102, based upon the results of the check, may validate the results against every acceptable or possible path through the code under test or checking. These acceptable values can be generated offline and stored in hash or interrupt service routine (ISR) hash compare 114 which may be implemented by, for example, a table, lookup table, hardware lookup table, or content addressable memory. Each possible path through test code may, through its combination of instructions or addresses, yield a unique value when the CRC check is performed.

When operating, instruction codes from flash memory 106 are fed to CRC circuit 102. For each triggered instruction cycle identified by CRC trigger control 110, a new CRC check value is calculated by CRC circuit 102 using polynomial 112. After termination of a capture sequence the results can be read back. The generated CRC check value may be compared by CRC circuit 102 with hash/ISR hash compare 114. If no match is found with the hash values provided, then an interrupt can be generated indicating an illegal program flow sequence. The interrupt may inform a user or system 100 that a flow error has occurred. Such a flow error may arise from, for example, a bug, error, memory corruption, or malware (such as one that injects code maliciously into a system).

By offloading the matching of execution code to CRC circuit 102, microcontroller 104 may otherwise operate with zero overhead added to the code or unit under test. No effect might be made on program flow and no effect might be made on critical instruction timing.

In one embodiment, hash comparisons may be used to account for program interruptions through ISRs or other interrupts. Furthermore, the hash comparison may be used to account for or detect program flow errors, program flow unhandled states, and operational errors. Asynchronous events such as ISRs may cause deterministic flow issues. To solve such problems, in one embodiment, when an ISR is generated or microcontroller 104 is in exception mode, flow analysis by CRC circuit 102 may be disabled. In another embodiment, when an ISR is generated or microcontroller 104 is in exception mode, the instructions for the ISR might be masked out such that these instructions do not cause a CRC check by CRC circuit 102. when an ISR is generated or microcontroller 104 is in exception mode, an 'ISR Context' store or information can be provided. The otherwise arbitrary results of code branching by an ISR might be reported, and thus CRC circuit 102 may analyze the execution of such an ISR. The expected CRC results for possible ISRs might be stored, in such a case, in hash/IRS hash compare 114. In such a case, the CRC results from the ISR will be compared just as other code is compared from microcontroller 104.

Furthermore, when an interrupt or another asynchronous event occurs while analysis on code coverage is being performed, CRC circuit 102 may stop operation or simply store its current state (including program counter, hash value, or other relevant information) into memory or on to a stack while the interrupt occurs. When the interrupt finishes, the state information may be popped from the stack and analysis may resume. As described above, the code associated with the interrupt might itself may be monitored if CRC circuit 102 is so configured. In addition, while the interrupt is operating, the interrupt may itself be interrupted by a higher priority interrupt, nested interrupt, or other asynchronous event. Accordingly, each level of interrupts may be handled by CRC circuit 102 by storing context information for each possible or actual level of interrupts used in the system.

FIG. 2 illustrates example pseudocode for execution by microcontroller 104. Such pseudocode may illustrate the execution of a function, such as one to convert ASCII values to hexadecimal values. The address lines, pseudocode, and resulting opcode combinations are illustrated for each step of the program. For example, at address x0682, a call to "MOVLW 0x61" may yield the data "3061".

Figures 3, 4:
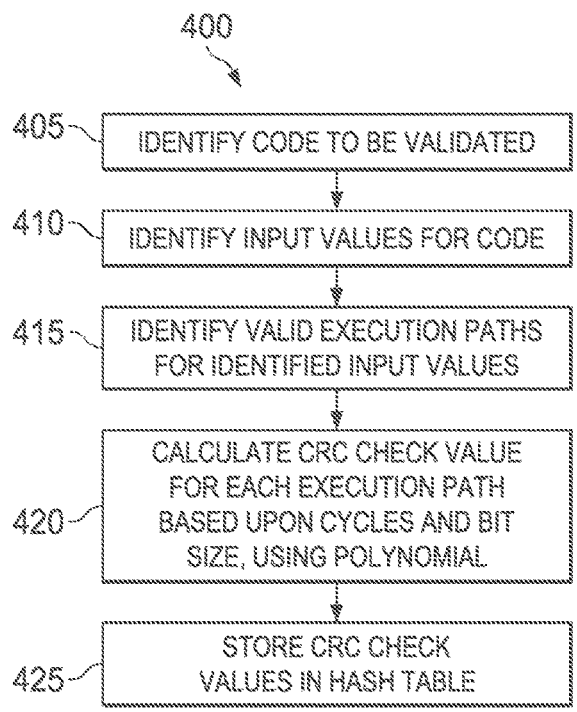
FIG. 3 illustrates an example embodiment of a table that may be generated from code to be validated.
FIG. 4 illustrates a flow chart of an example embodiment of a method for determining predicted check values.

FIG. 3 illustrates a table of some of the possible paths that might be executed in the code of FIG. 2, given particular input values. The possible paths of inputs "a", "d", "f", "0", "5", "9", "A", "D", "F", and "M" are shown as a few of the possible values that might be converted from ASCII to hexadecimal by the function shown in FIG. 2. For each functional input, the number of cycles that are expected to have been executed when handling that particular input are shown in the column for cycle count. Such a number of cycles may be determined from program counter 108. Furthermore, the bit length, or number of bits, of memory that are expected to have been reached during such execution for the particular input are shown in the column for bit length. These values may be computed according to polynomial 112 used by CRC circuit 102 and are shown in the column for CRC. The relationship of function input to CRC are stored as hashes in hash/ISR compare 114.

For example, the paths for each of the inputs "a", "d" and "f" are expected to be the same. This is because, as shown in the pseudocode of FIG. 2, each of these inputs follows the true branch of the if statement on line 17 as each is a lower case letter. Furthermore, each of these will execute for fifteen cycles and the bit length of 120. In another example, the paths of each of the inputs "0", "5", and "9" are expected to be the same, as each is a number. Each is expected to follow the pseudocode false branch of the if statement on line 17 and the true branch of the if statement on line 19. Each of these branches will execute for twenty cycles with a bit length of 160. In yet another example, the paths of each of the inputs "A", "D", and "F" are expected to be the same as each is an uppercase letter. Each is expected to follow the pseudocode false branch of the if statement on line 17, the false branch of the if statement on line 19, and the true branch of the if statement on line 21. Each of these branches will execute for twenty-nine cycles and a bit length of 232. In still another example, the path of the input "M" as well as any other invalid hexadecimal character is expected to follow the pseudocode false branch of the if statement on line 17, the false branch of the if statement on line 19, the false branch of the if statement on line 21, and the else statement on lines 23 and 24.

Accordingly, CRC circuit 102 may monitor a subsequent execution of the ASCII to hex function shown in FIG. 2. With a test input of "a", "d" or "f", CRC circuit 102 may determine if the CRC check result of the program counter and memory contents expects those shown in FIG. 3. If so, the program may be validated with respect to that input. Otherwise, an exception or interrupt might be generated. With a test input of an uppercase letter, CRC circuit 102 may determine if the CRC check result of the program counter and memory contents expects those shown in FIG. 3 for uppercase letters. With a test input of a number, CRC circuit 102 may determine if the CRC check result of the program counter and memory contents expects those shown in FIG. 3 for numbers. With a test input of any other character, CRC circuit 102 may determine if the CRC check result of the program counter and memory contents expects those shown in FIG. 3 for "M" or other inputs.

The example CRC check values in FIG. 3 represent selection of a polynomial wherein the chance of collision is 0.0016% given the restricted set of possible opcodes, and a Hamming distance of five.

FIG. 4 is an illustration of an example embodiment of a method 400 for analyzing code. Method 400 may be used to generate hash values or CRC check values for known execution paths through a given code segment that are to be expected when executing the code. Method 400 may be implemented by execution of computer-readable instructions on one or more a non-transitory computer-readable media by a processor. In one embodiment, method 400 may be implemented by execution of software. Method 400 may be performed in conjunction with method 500, discussed below. Method 400 may be performed at least once for any code, segment, application, program, or other instructions to be executed and validated such that CRC circuit 102 may subsequently validate such code.

At 405, code to be validated may be identified. At 410, input values for such code may be identified. The values may include a subset or all possible values that may be input into the code segment. At 415, valid execution paths for these identified values may be determined. Data may be collected about each such path, such as number of cycles and bit length.

At 420, for each execution path and its associated data, a CRC check value may be determined using a polynomial. The same polynomial may be used in method 500 to validate execution of the code segment. At 425, the check values may be stored in a hash table or other suitable data structure. Method 400 may terminate or may repeat for additional code segments.

Figure 5:
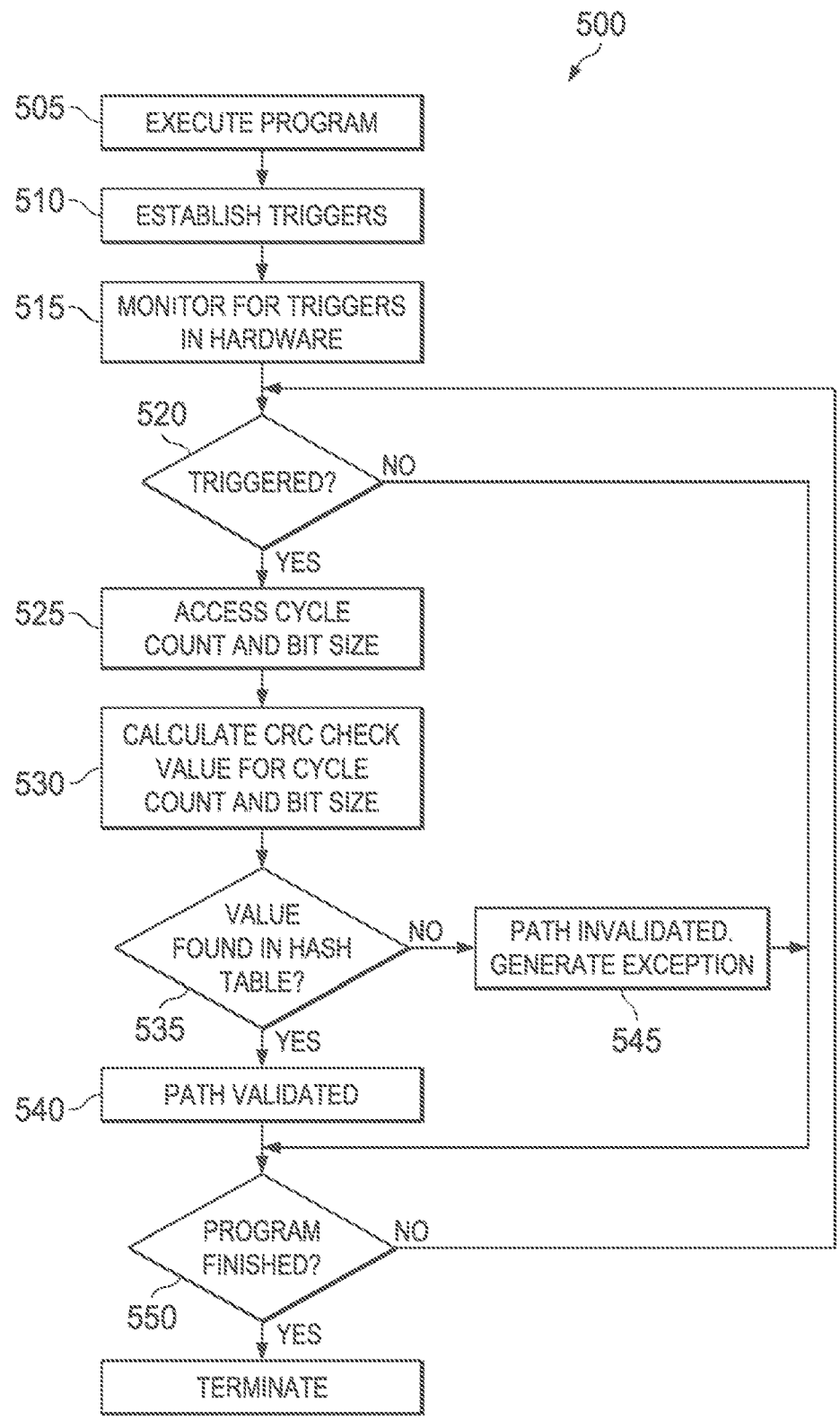
FIG. 5 illustrates a flow chart of an example embodiment of a method for validating code.

FIG. 5 is an illustration of an example embodiment of another method 500 for analyzing code. Method 500 may be used to analyze code in view of generated hash values or CRC check values. Method 500 may be implemented by hardware, such as CRC circuit 102 and associated mechanisms.

At 505, the program to be validated may be executed. Monitoring of the program may be established by setting registers values or otherwise activating hardware monitors. At 510, triggers for such monitoring may be established. Such triggers may specify the criteria to start and stop monitoring the execution paths of the program.

At 515, the hardware mechanism such as CRC circuit 102 may monitor for triggers to start validating the execution paths. At 520, is may be determined whether an execution path has been performed that is to be validated. If so, method 500 may proceed to 525. Otherwise, method 500 may proceed to 550.

At 525, the execution path's data may be accessed. Such data may include, for example, cycle count of the path and a bit size of the path. At 530, the CRC check value of such data may be performed. The check value may be determined using the same polynomial as used in method 400. At 535, it may be determined whether the check value is found within the hash table populated during the execution of method 400. If the check value is found, method 500 may proceed to 540. Otherwise, method 500 may proceed to 545.

At 540, it may be determined that the path has been validated. At 545, it may be determined that the path is not valid. An exception, interrupt, error, bit, or other suitable message may be generated, issued, or stored. The message may identify the path.

At 550, it may be determined whether the program has finished executing. If the program has not finished, method 500 may return to 520. Otherwise, method 500 may terminate.

Although an example order of steps is shown, the steps of the methods discussed above may be performed in any order. Moreover, one or more steps may be optionally repeated or omitted. The methods may be performed beginning at any suitable initialization point.

Method 400 may be executed during development of code to characterize the code that has been written. Subsequently, method 500 may be executed for each possible execution path, input values, or other parameters developed from the code. As a result, all of the code may be covered with tests. Furthermore, after software is released, method 400 may be executed to characterize the code. In one embodiment, all execution paths may be characterized. In another embodiment, crucial execution paths or execution paths prone to malware injection, overflows, or other attacks or bugs may be characterized. When such code is executed by various users, method 500 may be performed. A fault in the code may be generated upon execution of a disallowed path (shown by a hash without a match). In such a case, the code may be stopped and an error generated. The users may report the error from the interrupt to developers or administrators.

Although example embodiments have been described above, other variations and embodiments may be made from this disclosure without departing from the spirit and scope of these embodiments.

The invention claimed is:

1. An integrated circuit comprising a cyclic redundancy check (CRC) circuit configured to:
   read data identifying an execution path from code executed by a processor;
   determine a quantification of a bit length used to execute the code;
   determine a CRC check value for the data, including a calculation of a polynomial with the quantification of the bit length used to execute the code used as a parameter in the polynomial;
   based upon the CRC check value, determine whether the execution path is valid; and
   based on a determination that the execution path is not valid, generate an interrupt indicating an illegal program flow sequence.

2. The integrated circuit according to claim 1, wherein the CRC circuit is further configured to:
   compare the CRC check value with a table of known values of valid execution paths;
   based on a determination that the CRC check value is not present within the table, generate a message to identify the execution path as invalid; and
   based on a determination that the CRC check value is present within the table, validating that the execution path is valid.

3. The integrated circuit according to claim 1, further comprising a trigger circuit configured to identify that code to be validated has been executed.

4. The integrated circuit according to claim 1, further comprising a trigger circuit configured to identify that code to be validated has been executed, the trigger circuit programmable to trigger on a next instruction cycle, a specific predetermined instruction, or a program counter address.

5. The integrated circuit according to claim 1, wherein the CRC circuit is further configured to determine the CRC check value for the data by applying the polynomial to program counter information from a central processing unit executing the code.

6. The integrated circuit according to claim 1, wherein the CRC circuit is further configured to determine the CRC check value for the data by applying the polynomial to a number of cycles used to execute the code.

7. A processor, comprising:
   a central processing unit configured to execute code; and
   an integrated circuit comprising a cyclic redundancy check (CRC) circuit configured to:
      read data identifying an execution path from the code as executed by the central processing unit;
      determine a quantification of a bit length used to execute the code;
      determine a CRC check value for the data, including a calculation of a polynomial with the quantification of the bit length used to execute the code used as a parameter in the polynomial;
      based upon the CRC check value, determine whether the execution path is valid; and
      based on a determination that the execution path is not valid, generate an interrupt indicating an illegal program flow sequence.

8. The processor of claim 7, wherein the CRC circuit is further configured to:
   compare the CRC check value with a table of known values of valid execution paths;
   based on a determination that the CRC check value is not present within the table, generate a message to identify the execution path as invalid; and
   based on a determination that the CRC check value is present within the table, validating that the execution path is valid.

9. The processor of claim 7, further comprising a trigger circuit configured to identify that code to be validated has been executed.

10. The processor of claim 7, further comprising a trigger circuit configured to identify that code to be validated has been executed, the trigger circuit programmable to trigger on a next instruction cycle, a specific predetermined instruction, or a program counter address.

11. The processor of claim 7, wherein the CRC circuit is further configured to determine the CRC check value for the data by applying the polynomial to program counter information from a central processing unit executing the code.

12. The processor of claim 7, wherein the CRC circuit is further configured to determine the CRC check value for the data by applying the polynomial to a number of cycles used to execute the code.

13. A method, comprising:
   reading data identifying an execution path from the code as executed by a central processing unit;
   determining a quantification of a bit length used to execute the code;
   determining a CRC check value for the data, including calculating a polynomial with the quantification of the bit length used to execute the code used as a parameter in the polynomial;
   based upon the CRC check value, determining whether the execution path is valid; and based on a determination that the execution path is not valid, generating an interrupt indicating an illegal program flow sequence.

14. The method of claim 13, wherein the CRC circuit is further configured to:
compare the CRC check value with a table of known values of valid execution paths;
based on a determination that the CRC check value is not present within the table, generate a message to identify the execution path as invalid; and
based on a determination that the CRC check value is present within the table, validating that the execution path is valid.

15. The method of claim 13, further comprising triggering the determination of the CRC check value based upon a determination that code to be validated has been executed.

16. The method of claim 13, further comprising triggering the determination of the CRC check value based upon on a next instruction cycle, a specific predetermined instruction, or a program counter address.

17. The method of claim 13, further comprising determining the CRC check value for the data by applying the polynomial to program counter information from a central processing unit executing the code.

18. The method of claim 13, further comprising determining the CRC check value for the data by applying the polynomial to a number of cycles used to execute the code.

* * * * *

UNITED STATES PATENT AND TRADEMARK OFFICE
CERTIFICATE OF CORRECTION

PATENT NO. : 10,331,513 B2
APPLICATION NO. : 15/221409
DATED : June 25, 2019
INVENTOR(S) : Darren Wenn It is certified that error appears in the above-identified patent and that said Letters Patent is hereby corrected as shown below:

In the Specification

Column 1,
Background, Line 33, "…according to standards such as WC 61508, WC 26262,'…" ---Change to--- "…according to standards such as IEC 61508, IEC 26262,…"

Signed and Sealed this
Thirtieth Day of July, 2019

Andrei Iancu
*Director of the United States Patent and Trademark Office*